United States Patent
Sanjeev et al.

(10) Patent No.: US 9,633,203 B2
(45) Date of Patent: Apr. 25, 2017

(54) SPAM NOTIFICATION DEVICE

(71) Applicant: Cellco Partnership, Basking Ridge, NJ (US)

(72) Inventors: Kumar Sanjeev, San Ramon, CA (US); Lodema M. Steinbach, Clayton, CA (US); Derrick Snarr, Walnut Creek, CA (US)

(73) Assignee: Cellco Partnership, Basking Ridge, NJ (US)

( * ) Notice: Subject to any disclaimer, the term of this patent is extended or adjusted under 35 U.S.C. 154(b) by 108 days.

(21) Appl. No.: 14/024,938

(22) Filed: Sep. 12, 2013

(65) Prior Publication Data

US 2015/0074802 A1    Mar. 12, 2015

(51) Int. Cl.
| | |
|---|---|
| *H04L 29/06* | (2006.01) |
| *G06F 21/55* | (2013.01) |
| *H04L 12/58* | (2006.01) |
| *G06F 21/56* | (2013.01) |
| *H04W 4/12* | (2009.01) |

(52) U.S. Cl.
CPC .............. *G06F 21/55* (2013.01); *G06F 21/56* (2013.01); *H04L 51/12* (2013.01); *H04L 63/1441* (2013.01); *G06F 2221/032* (2013.01); *H04W 4/12* (2013.01)

(58) Field of Classification Search
CPC .............. H04L 63/1416; H04L 63/1408; H04L 63/145; H04L 63/1441; H04L 63/1458; H04L 51/12; G06F 21/55; G06F 21/56; G06F 2221/032; H04W 4/12

USPC .......................................................... 726/22
See application file for complete search history.

(56) References Cited

U.S. PATENT DOCUMENTS

| | | | |
|---|---|---|---|
| 7,899,866 B1 * | 3/2011 | Buckingham ........... | H04L 51/12 709/206 |
| 7,975,010 B1 * | 7/2011 | Satish ........................... | 709/206 |
| 8,417,783 B1 * | 4/2013 | Sharma et al. ............... | 709/206 |
| 8,630,393 B2 * | 1/2014 | Baril et al. ............ | H04M 3/436 379/114.14 |
| 2004/0215977 A1 * | 10/2004 | Goodman ............ | G06Q 10/107 726/22 |
| 2005/0204005 A1 * | 9/2005 | Purcell et al. ................. | 709/206 |
| 2006/0053203 A1 * | 3/2006 | Mijatovic ..................... | 709/206 |

(Continued)

OTHER PUBLICATIONS

Ramachandran et al. ("Filtering Spam with Behavioral Blacklisting"; CCS'07, Oct. 29-Nov. 2, 2007, Alexandria, VA, USA.*

(Continued)

*Primary Examiner* — Mahfuzur Rahman
*Assistant Examiner* — Narciso Victoria

(57) ABSTRACT

A device is configured to receive triggering information including a set of conditions associated with spam. The device is configured to receive a message from a sending device, and to determine that the message is spam based on determining that the message satisfies a threshold quantity of conditions of the set of conditions. The device is configured to provide a notification indicating that the message may be spam, and receive response information, based on the notification, indicating that the sending device is to be blacklisted. The device is configured to cause, based on the response information, a future message from the sending device to be blocked prior to being presented to a user.

20 Claims, 10 Drawing Sheets

(56) References Cited

U.S. PATENT DOCUMENTS

2012/0215862 A1* 8/2012 Cai et al. .................. 709/206
2013/0196697 A1* 8/2013 Lew et al. .................. 455/466

OTHER PUBLICATIONS

Wikipedia, "Mobile phone spam", http://en.wikipedia.org/w/index.php?title=Mobile_phone_spam&oldid=571336634, Sep. 3, 2013, 4 pages.
Wikipedia, "Spam (electronic)", http://en.wikipedia.org/w/index.php?title=Spam_%28electronic%29&oldid=571993750., Sep. 12, 2013, 18 pages.

* cited by examiner

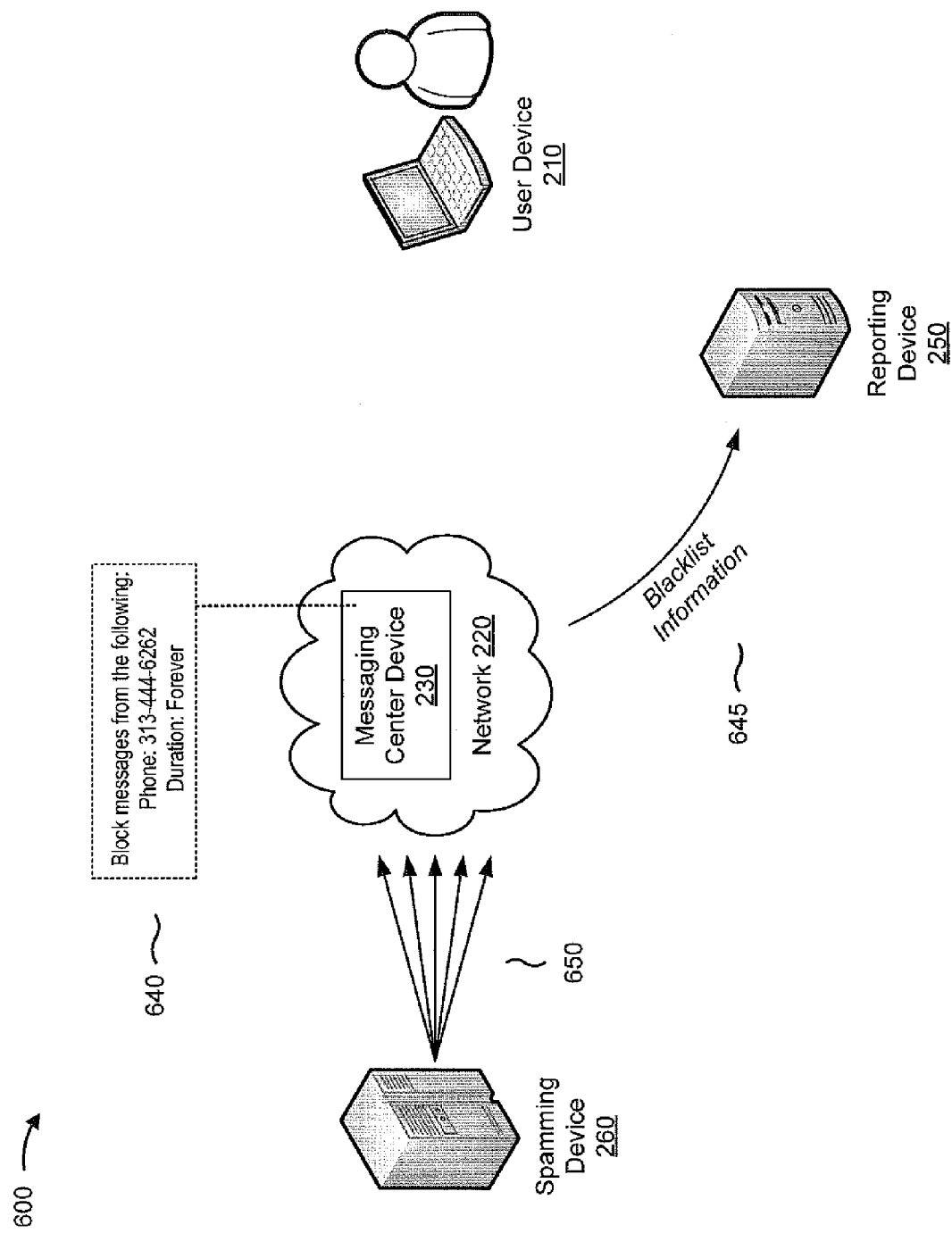

SPAM NOTIFICATION DEVICE

BACKGROUND

Communication devices (e.g., smartphones, computers, etc.) may receive messages, such as email, short message service ("SMS") text messages, a multimedia message service ("MMS") messages, instant messages, pictures, videos, audio recordings, or the like. Some messages may be unsolicited, and may include unwanted material, such as advertisements (e.g., electronic spam).

BRIEF DESCRIPTION OF THE DRAWINGS

FIGS. 6A-6B are diagrams of another example implementation relating to the example process shown in FIG. 4.

DETAILED DESCRIPTION OF PREFERRED EMBODIMENTS

The following detailed description of example implementations refers to the accompanying drawings. The same reference numbers in different drawings may identify the same or similar elements.

A user device (e.g., a smartphone, a computer, etc.) may receive unsolicited messages from an unknown sender (e.g., spam). The unsolicited messages may include advertisements, harmful software (e.g., malware), solicitations for personal and/or financial information associated with the user, or the like. A user of the user device may determine that a message is spam and may take appropriate action (e.g., may delete the message, may move the message to a junk folder, may report the message as spam, etc.).

However, some spam may be designed to deceive the user into believing that the message is legitimate (e.g., from a trusted source, such as a bank, a service provider, an acquaintance, etc.). In this instance, the user may have difficulty determining that the message is spam, and may be susceptible to being harmed (e.g., to downloading malware, to providing personal and/or financial information that may permit identity theft, etc.). Additionally, even when the user has determined that the message is spam, the user may still receive future spam messages from the sending device, and thus may be susceptible to future harm.

Implementations described herein may allow a user device to automatically determine that a message is spam, and may prevent messages, provided by the sending device, from being delivered to the user device. In some implementations, the user device may include a mobile communication device, and the message may include an SMS text message and/or an MMS message. In some implementations, the user device may include a mobile or non-mobile device and the message may include an SMS message, an MMS message, an email, an instant message, or a similar type of message.

Figure 1:
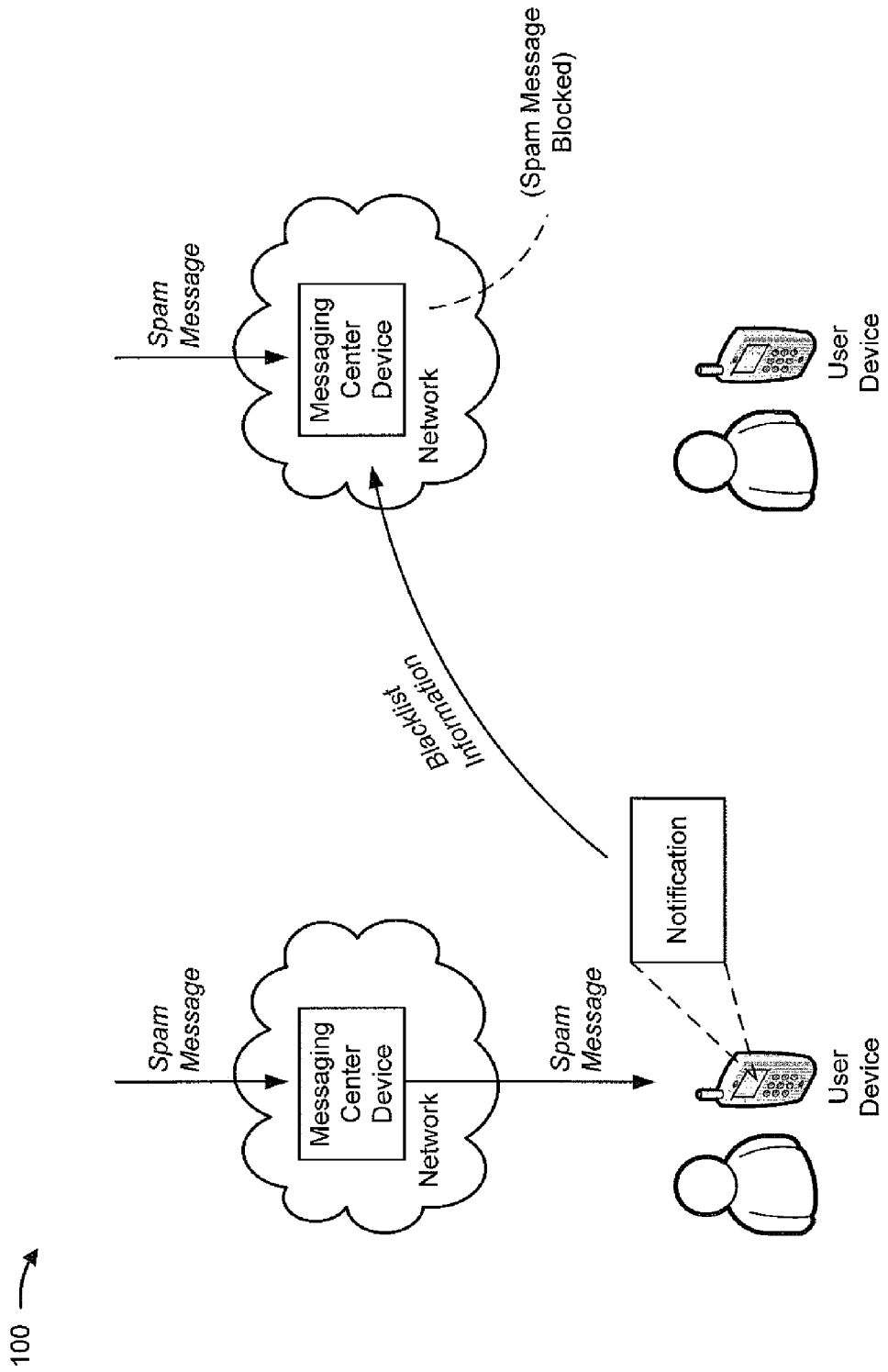
FIG. 1 is a diagram of an overview of an example implementation described herein.

FIG. 1 is a diagram of an overview of an example implementation 100 described herein. As shown in FIG. 1, example implementation 100 may include a user device, a messaging center device, and a spamming device.

As shown in FIG. 1, the user device may receive triggering information. The triggering information may include information that identifies a set of conditions that, when satisfied, indicate that a message may be spam. The user device may receive a message from a spamming device (e.g., via a messaging center device associated with a network). The user device may determine that the message satisfies the set of conditions associated with the triggering information. Based on determining that the message satisfies the set of conditions, the user device may provide a notification indicating to a user of the user device that the message may be spam.

As further shown in FIG. 1, the user device may provide blacklist information to the messaging center device. The blacklist information may indicate that the messaging center device is to prevent delivery of a future message, that is directed to the user device, and sent from the spamming device. The messaging center device may receive the future message, and, based on the blacklist information, may not deliver the message to the user device (e.g., may block the message). In this manner, the user device may determine that a message is spam, and may provide information to a messaging center device to permit the messaging center device to block future messages from the spamming device.

Figure 2:
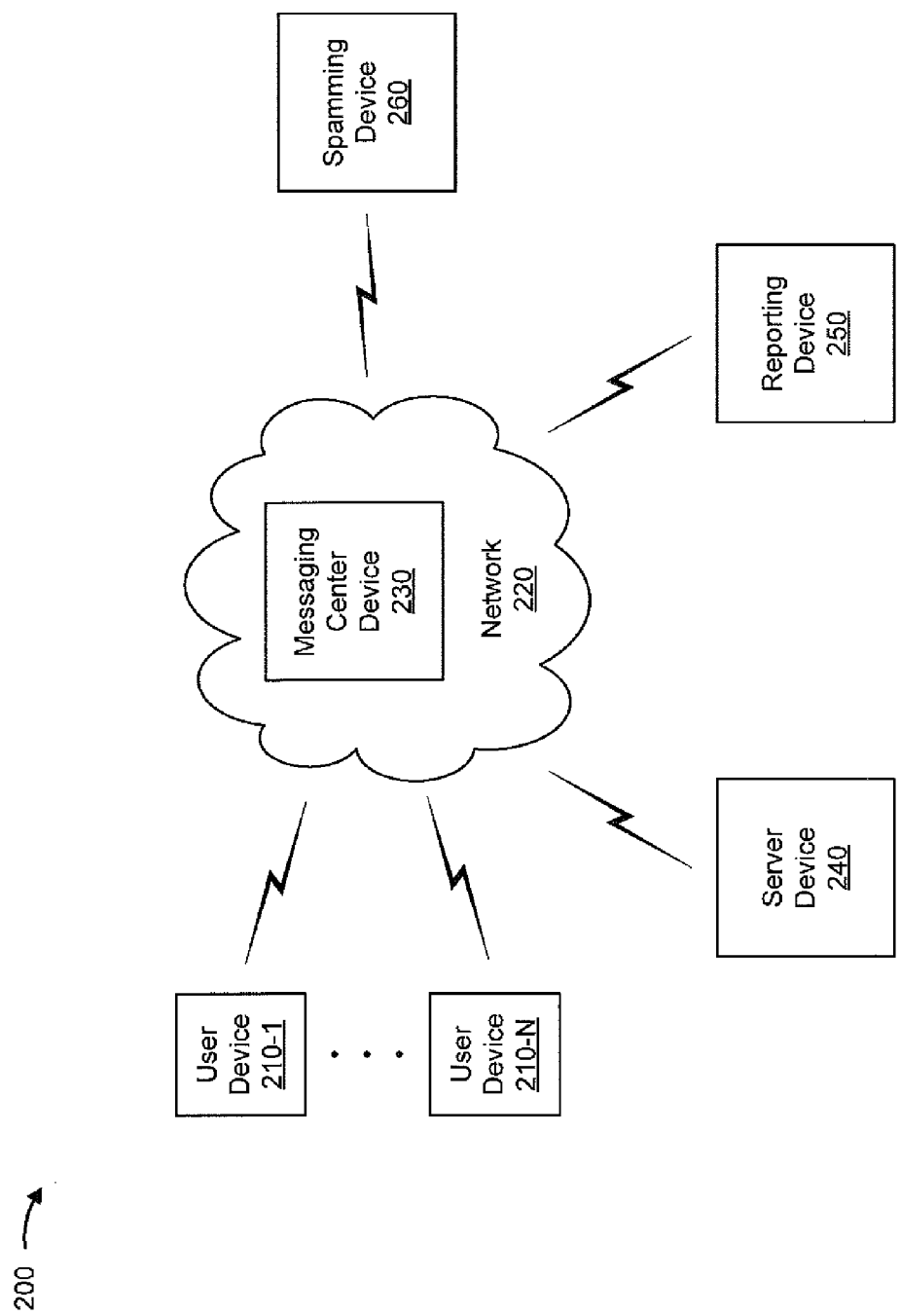
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include user devices 210-1 . . . 210-N(N>1) (hereinafter referred to collectively as "user devices 210," and individually as "user device 210"), a network 220, a messaging center device 230, a server device 240, a reporting device 250, and a spamming device 260. Devices of environment 200 may interconnect via wired connections, wireless connections, or a combination of wired and wireless connections.

User device 210 may include a device capable of sending and/or receiving a message. For example, user device 210 may include a cellular telephone, a smartphone, a computing device (e.g., a desktop computer, a laptop computer, a tablet computer, a handheld computer, etc.), or a similar device. User device 210 may receive information from and/or transmit information to messaging center device 230, server device 240, reporting device 250, and/or spamming device 260.

Network 220 may include one or more wired and/or wireless networks. For example, network 220 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, or a combination of these or other types of networks. Network 220 may host messaging center device 230.

Messaging center device 230 may include a device capable of directing a message to a receiving device via a network (e.g., network 220). For example, messaging center device 230 may include a short message service center ("SMSC"), a multimedia message service center ("MSMC"), an email server, an instant messaging server, or a similar device. Messaging center device 230 may receive information from and/or transmit information to user device 210, server device 240, reporting device 250, and/or spamming device 260.

Server device 240 may include one or more devices capable of receiving, storing, processing, and/or transmitting information, such as information associated with a message. For example, server device 220 may include a computing device, such as a server, a desktop computer, a laptop computer, a tablet computer, a handheld computer, or a similar device. Server device 240 may receive information from and/or transmit information to user device 210, messaging center device 230, reporting device 250, and/or spamming device 260.

Reporting device 250 may include a device capable of receiving, storing, processing, and/or transmitting information, such as information indicating that a message is spam. For example, reporting device 250 may include a computing device, such as a server, a desktop computer, a laptop computer, a tablet computer, a handheld computer, or a similar device. Reporting device 250 may receive information from and/or transmit information to user device 210, messaging center device 230, server device 240, and/or spamming device 260.

Spamming device 260 may include a device capable of sending and/or receiving a message (e.g., a spam message). For example, spamming device 260 may include a computing device (e.g., a desktop computer, a laptop computer, a handheld computer, etc.), a mobile device (e.g., a cellular telephone, a smartphone, etc.), a server, or a similar device. Spamming device 260 may receive information from and/or transmit information to user device 210, messaging center device 230, server device 240, and/or reporting device 250.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
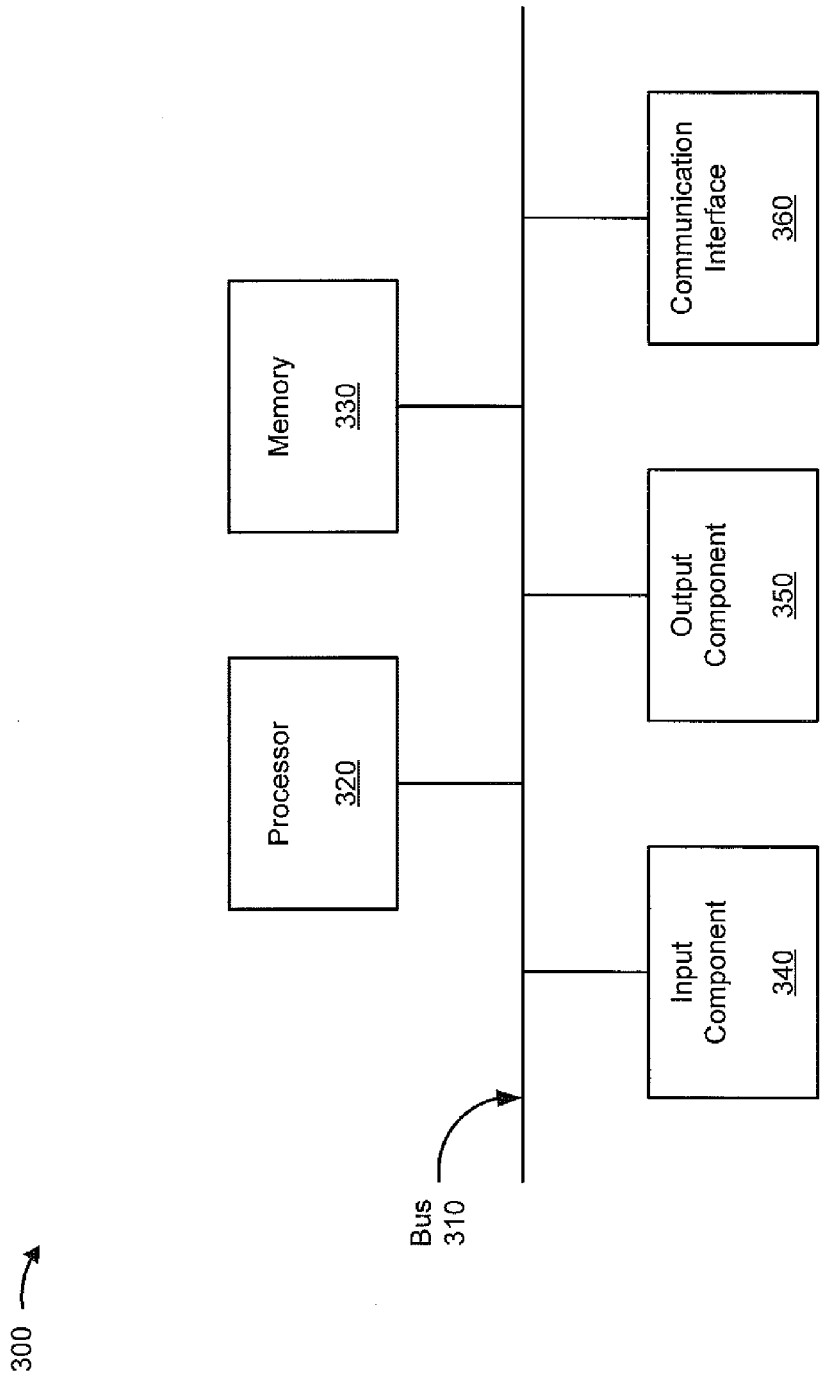
FIG. 3 is a diagram of example components of one or more devices of FIG. 2.

FIG. 3 is a diagram of example components of a device 300. Device 300 may correspond to user device 210, messaging center device 230, server device 240, reporting device 250, and/or spamming device 260. Additionally, or alternatively, each of user device 210, messaging center device 230, server device 240, reporting device 250, and/or spamming device 260 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing component (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes ("LEDs"), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
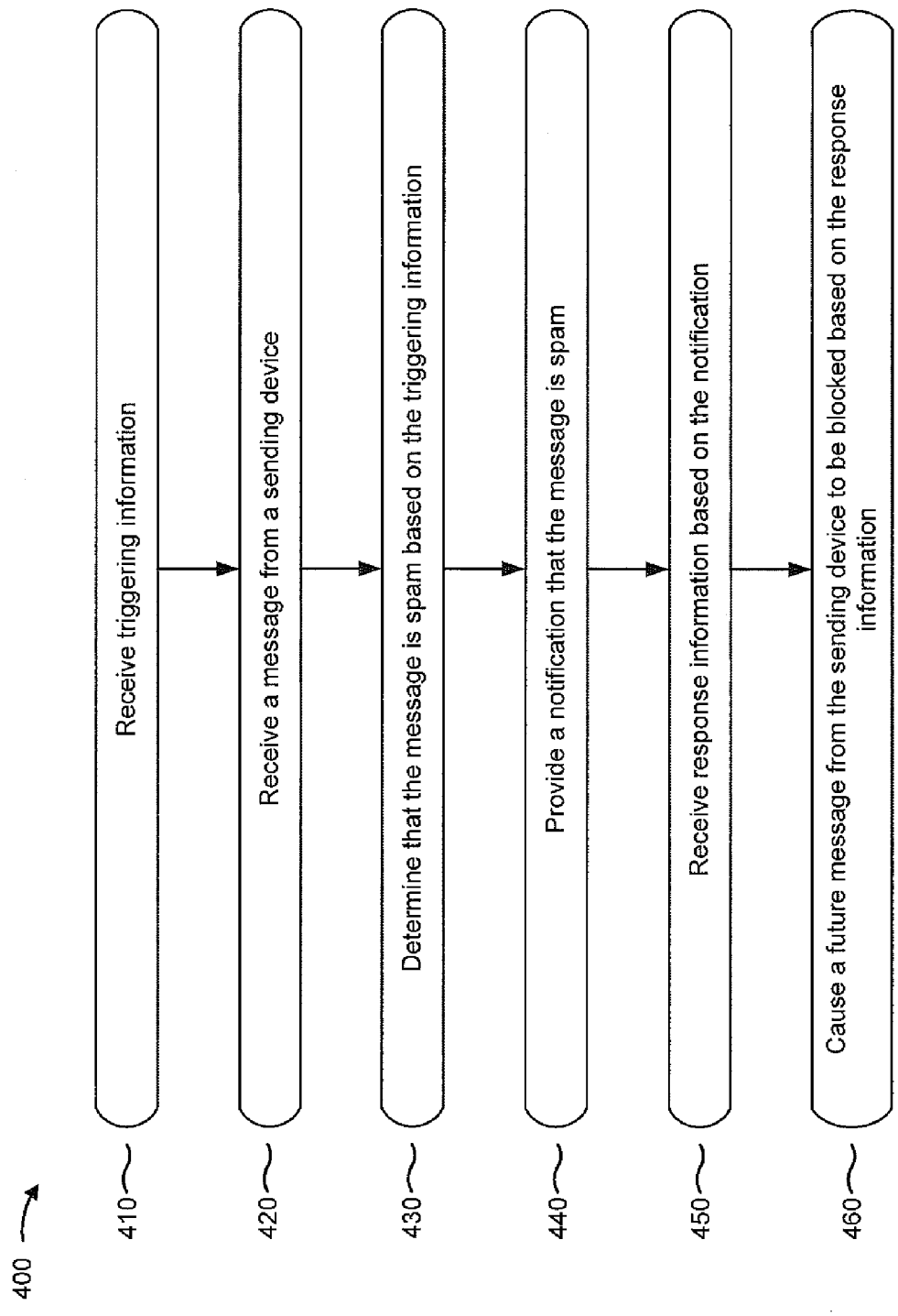
FIG. 4 is a flow chart of an example process for determining that a message is spam.

FIG. 4 is a flow chart of an example process 400 for determining that a message is spam. In some implementations, one or more process blocks of FIG. 4 may be performed by user device 210. Additionally, or alternatively, one or more process blocks of FIG. 4 may be performed by another device or a group of devices separate from or including user device 210, such as messaging center device 230, server device 240, and/or reporting device 250.

As shown in FIG. 4, process 400 may include receiving triggering information (block 410). For example, user device 210 may receive the triggering information from server device 240. Additionally, or alternatively, user device 210 may receive the triggering information from messaging center device 230, and/or reporting device 250. In some implementations, user device 210 may receive the triggering information from a user of user device 210 (e.g., via user input).

In some implementations, the triggering information may include information that identifies one or more conditions, associated with a message (e.g., an email, an SMS text message, an MMS message, an instant message, etc.), that indicate that the message may be spam (e.g., electronic spam). In some implementations, spam may include an unsolicited message directed to user device 210. For example, spam may include a commercial message (e.g., an advertisement) that is provided to a set of user devices 210 indiscriminately (e.g., in bulk), a message that includes harmful software (e.g., malware), a message intended to obtain personal information associated with a user of user device 210 (e.g., contact information, account information, financial information, etc.), or the like.

In some implementations, the condition, when satisfied, may indicate that the message is spam. For example, the condition may include an existence or an absence of an attribute associated with the message. In some implementations, the attribute may include an identifier that identifies a source of the message. For example, the attribute may include an email address associated with a sending device, a mobile device number (e.g., "MDN") associated with the sending device, a mobile equipment identifier ("MEID") associated with the sending device, an internet protocol ("IP") address associated with the sending device, or the like. Additionally, or alternatively, the attribute may include information associated with the content of the message, such as a call to action (e.g., a request for a user of user device 210 to call a telephone number, visit a website, click a link, open an attachment, responds to the message, etc.), an invitation to purchase a product and/or service, a price, a product name, a service name, a company name, or the like.

In some implementations, the condition may indicate that the message is a first message between a sending device and a receiving device. For example, the condition may indicate that the message is a first message received by user device 210 from spamming device 260 (e.g., that the message is not a reply to an earlier message provided by user device 210). In some implementations, the condition may indicate that user device 210 has not communicated with the sending device prior to the message. For example, the condition may indicate that the identifier associated with the sending device is not associated with a communication history of the user device (e.g., a list of past emails received by user device 210, past voice calls received by user device 210, past SMS text messages received by user device 210, etc.).

In some implementations, the condition may indicate that that the sending device is not associated with a contact list associated with user device 210. For example, user device 210 may include a contact list (e.g., a list of names, telephone numbers, email addresses, etc., associated with user device 210 and/or a user of user device 210). Additionally, or alternatively, the contact list may include contacts in an address book associated with user device 210 and/or the user of user device 210, contacts associated with previous communications with user device 210 (e.g., a communication history), or the like. The condition may indicate that an identifier associated with the sending device is not associated with the contact list (e.g., that the sending device and/or a sender associated with the sending device is unknown).

In some implementations, the condition may indicate that the message includes a call to action. For example, the call to action may include a phone number (e.g., an MDN). Additionally, or alternatively, the call to action may include a uniform resource locator ("URL") directed to a web address. In some implementations, the call to action may include a solicitation for a user of user device 210 to respond to the message (e.g., with sensitive information).

In some implementations, the condition may indicate that an identifier associated with the message is of a particular type (e.g., an email address, an identifier of a particular length, etc.). For example, the condition may indicate that the message type includes a ten-digit MDN. In some implementations, a condition that requires a ten-digit MDN may exclude messages associated with a short code (e.g., an MDN of fewer than ten digits) from being identified as spam. For example, a message associated with a short code may permit a user of user device 210 to opt-out of receiving future messages associated with the short code (e.g., by texting "stop" to the short code). A condition that requires a ten-digit MDN may permit user device 210 to receive a message from which the user may opt-out (e.g., a message for which blocking future messages may not be necessary). Additionally, or alternatively, the condition that requires a ten-digit MDN may exclude messages associated with a long code (e.g., an MDN greater than ten digits) from being identified as spam, such as a message associated with an international sending device.

As further shown in FIG. 4, process 400 may include receiving a message from a sending device (block 420). For example, user device 210 may receive the message from spamming device 260. Additionally, or alternatively, user device 210 may receive the message from a second user device 210-2, server device 240, and/or reporting device 250.

In some implementations, the message may include a communication received via a network (e.g., network 220). For example, the message may include an email, an SMS text message, an MMS message, an instant message, or the like. In some implementations, user device 210 may receive the message by use of an application (e.g., an email client, an Internet browser, an instant messaging service, a texting application, etc.).

As further shown in FIG. 4, process 400 may include determining that the message is spam based on the triggering information (block 430). For example, spam may include an unsolicited message (e.g., an unsolicited email, an unsolicited SMS text message, an unsolicited MMS message, an unsolicited instant message, etc.) directed to user device 210, which may be associated with an advertisement, malware, phishing, or the like, which is provided to a set of user devices 210 indiscriminately (e.g., in bulk).

In some implementations, user device 210 may determine that the message is spam based on determining that one or more attributes associated with the message satisfy a condition (e.g., a condition identified in the triggering information). For example, user device 210 may determine that the message received from spamming device 260 is a first message sent from spamming device 260 to user device 210 (e.g., that the message is not a response to an earlier message provided by user device 210), that spamming device 260 is not associated with a contact list associated with user device 210, that the message includes a URL and/or a phone number, and/or that the message is associated with an email address and/or ten-digit phone number.

In some implementations, user device 210 may determine that the message is spam based on determining that the message satisfies a condition. Additionally, or alternatively, user device 210 may determine that the message is spam based on determining that the message satisfies a combination of conditions.

In some implementations, user device 210 may determine that the message is spam based on determining that the message satisfies a threshold quantity of conditions. For example, user device 210 may determine that the message is spam based on determining that the message is a first message, and that message is not associated with a sender in a contact list, and that the message includes a call to action, and that the message is an email and/or ten-digit phone number.

In some implementations, user device 210 may determine which of the conditions to apply to the message automatically. Additionally, or alternatively, user device 210 may determine the conditions based on a user input (e.g., from a user of user device 210), a business rule, or the like.

In some implementations, user device 210 may determine a set of weights associated with the conditions (e.g., the set of conditions identified by the triggering information). The weight may include a value (e.g., a number, a percentage, etc.) that represents a relative significance associated with the condition. For example, user device 210 may determine a first weight associated with a first condition, a second weight associated with a second condition, and so forth. The first weight may be associated with a value that is greater than a value of the second weight, thus indicating that the first condition may be more significant than the second condition in determining that the message is spam (e.g., that the presence of the first condition is more likely to indicate that the message is spam than the presence of the second condition). Additionally, or alternatively, each weight, of the set of weights, may be of equal value.

In some implementations, user device 210 may determine a score associated with the message based on the weights. The score may reflect a probability that the message is spam. In some implementations, user device 210 may determine the score by adding the weights associated with the conditions (e.g., the set of conditions satisfied by the message). For example, user device 210 may determine that a message satisfies a first condition associated with a first weight (e.g., 0.3), a second condition associated with a second weight (e.g., 0.8), and a third condition associated with a third weight (e.g., 0.6). User device 210 may add the first weight, the second weight, and the third weight to determine a score associated with the message (e.g., 1.7). User device 210 may determine that the message is spam based on determining that the score is greater than a threshold score (e.g., 1.2).

In some implementations, the message may satisfy a quantity of conditions that is less than a set of possible conditions (e.g., identified in the triggering information). Based on a set of weights associated with the quantity of conditions, user device 210 may determine a score that is greater than a threshold score. In this manner, user device 210 may determine that a message is spam even though not all conditions, of the set of possible conditions, are satisfied by the message. Additionally, or alternatively, user device 210 may determine that a set of conditions (e.g., four conditions) may be associated with equal weights (e.g., 1), and may determine the threshold score (e.g., 4) so as to require satisfaction of the entire set of conditions (e.g., all four conditions) to determine that the message is spam.

In some implementations, user device 210 may determine that the message is spam based on a list of approved sending devices (e.g., a whitelist). For example, user device 210 may receive the list of approved sending devices from server device 240 and/or a user of user device 210. The list of approved sending devices may include a set of identifiers (e.g., phone numbers, email addresses, etc.) associated with a set of approved sending devices (e.g., sending devices approved by a network service provider associated with user device 210). User device 210 may determine that the message is associated with an identifier identifying an approved device, of the set of approved devices (e.g., user device 210 may determine that an identifier associated with the message matches an identifier on the whitelist). Based on determining that the message is associated with an approved sending device, user device 210 may determine that the message is not spam (e.g., even though the message may be associated with one or more conditions).

In some implementations, user device 210 may determine that the message is spam based on user input. For example, a user of user device 210 may provide user input (e.g., via a user interface associated with user device 210) indicating that the message is spam. In some implementations, user device 210 may display the message on a user interface associated with user device 210, and the user may provide user input by touching a region of the user interface for an extended time. Based on the user input, user device 210 may determine that the message is spam.

As further shown in FIG. 4, process 400 may include providing a notification that the message is spam (block 440). For example, user device 210 may provide the notification by displaying the notification on a user interface associated with user device 210 (e.g., a display, a touchscreen, etc.). Additionally, or alternatively, user device 210 may provide the notification to server device 240 and/or reporting device 250.

In some implementations, the notification may include or more characters (e.g., letters, numbers, symbols, etc.), pictures, sounds, or the like, that indicate that the message may be spam. For example, the notification may include a statement (e.g., a textual statement) that the message may be spam. In some implementations, user device 210 may display the notification in association with the message. For example, user device 210 may display the message on a user interface, and may display the notification near the message (e.g., below the message, above the message, next to the message, etc.). In some implementations, user device 210 may display the notification by use of a color, font, or the like, associated with the message (e.g., by displaying the message in a red color).

In some implementations, the notification may include information for reporting the message (e.g., for providing a report to reporting device 250), such as a phone number, an email address, URL, or the like. For example, the notification may include a URL (e.g., a link) to permit user device 210 to send a report that the message is spam.

In some implementations, the notification may include one or more options associated with the message. For example, the notification may include an option to report the message as spam, to delete the message, to ignore the message, or the like. In some implementations, the notification may include an option to indicate that the message is not spam (e.g., that the message is from an approved sending device, that the message is welcomed by the user, etc.). Additionally, or alternatively, the notification may include an option to block the sending device from sending future messages to user device 210 (e.g., blacklisting the sending device). In some implementations, the notification may include an option to block the future messages for a period of time (e.g., a week, a month, ninety days, etc.).

In some implementations, the message may include a URL, and user device 210 may display information associated with the URL. For example, user device 210 may display a preview of a target associated with the URL (e.g., a website, a document, etc.). In some implementations, user device 210 may determine that a message is not spam (e.g., that the message is not associated with one or more conditions) and may display the preview based on determining that the message is not spam. Additionally, or alternatively, user device 210 may determine that the message is spam and may not display the preview based on determining that the message is spam.

As further shown in FIG. 4, process 400 may include receiving response information based on the notification (block 450). For example, user device 210 may receive the response information from a user of user device 210 (e.g., via an input). Additionally, or alternatively, user device 210 may receive the response information from server device 240 and/or reporting device 250.

In some implementations, the response information may include information that identifies a course of action associated with the notification. For example, the response information may include a response to the notification. In some implementations, user device 210 may receive the response information from a user of user device 210 (e.g., via user input). Additionally, or alternatively, user device 210 may determine the response information automatically (e.g., based on a business rule, a predetermined user preference, etc.).

In some implementations, the response information may include a confirmation that the message is spam. For example, the user may provide information that confirms that the message is spam. Additionally, or alternatively, the response information may include an indication that the message is to be reported as spam. For example, the user may click on a URL associated with the message that permits user device 210 to report the message as spam (e.g., provide a report to reporting device 250).

In some implementations, the response information may include an indication that the message is not spam. Additionally, or alternatively, the response information may include an indication that the sending device (e.g., spamming device 260) is to be blocked from sending future messages (e.g., blacklisted).

In some implementations, the response information may identify a length of time for blocking the sending device (e.g., a quantity of time that the sending device is to be blocked). The length of time may be automatically selected, selected by a user of user device 210, or the like. For example, the response information may include a limited length of time (e.g., 30 days, 60 days, 90 days, etc.), an unlimited length of time (e.g., forever, indefinitely, etc.), an intermittent length of time (e.g., weekends, evenings, etc.), or the like. In some implementations, a user of user device 210 may provide information that identifies the length of time. For example, the user may select from a list of lengths of time (e.g., 30 days, 60 days, 90 days, indefinitely, etc.). Additionally, or alternatively, the user may input a custom length of time (e.g., a length of time determined by the user).

In some implementations, user device 210 may determine the length of time based on a score associated with the message (e.g., a score based on weights associated with the conditions satisfied by the message). For example, user device 210 may determine a set of score ranges associated with a set of lengths of time, such as a first score range (e.g., less than 1.4) associated with a first length of time (e.g., 30 days), a second score range (e.g., not less than 1.4 and less than 1.9) corresponding to a second length of time (e.g., 90 days), and a third score range (e.g., not less than 1.9) corresponding to a third length of time (e.g., forever). Based on determining that a score (e.g., 1.8) associated with the message falls in the second score range (e.g., greater than 1.4 and less than 1.9), user device 210 may determine that the message is to be blocked for the second length of time (e.g., 90 days).

In some implementations, user device 210 may determine the length of time based on lengths of time selected by other users of user devices 210 (e.g., an average length of time). For example, the other users may receive (e.g., via user devices 210) spam messages from a sending device (e.g., spamming device 260), and may specify various lengths of time for blocking future messages from the sending device. User device 210 may determine an average length of time for blocking messages from the sending device, and may determine the length of time based on the average length of time (e.g., to match the average length of time).

As further shown in FIG. 4, process 400 may include causing a future message from the sending device to be blocked based on the response information (block 460). For example, user device 210 may cause future messages from spamming device 260 to be blocked based on the response information (e.g., based on a user input indicating that spamming device 260 is to be blocked). In some implementations, user device 210 may receive the future message and may block the future message by preventing the future message from being displayed at user device 210. Additionally, or alternatively, user device 210 may provide information that permits another device (e.g., a network device associated with network 220, messaging center device 230, etc.) to block the future message.

In some implementations, user device 210 may determine blacklist information associated with the message and/or the sending device. The blacklist information may include information that allows one or more network devices (e.g., associated with network 220) to prevent user device 210 from receiving a message from a blocked device (e.g., spamming device 260, etc.). For example, the blacklist information may include an identifier associated with the sending device, such as a phone number (e.g., an MDN), an email address, an IP address, or the like. Additionally, or alternatively, the blacklist information may include a quantity of time that the sending device is to be blocked.

In some implementations, user device 210 may provide the blacklist information to messaging center device 230. Based on the blacklist information, messaging center device 230 may prevent a future message, provided by the sending device, from being delivered to user device 210. For example, messaging center device 230 may receive the blacklist information, and may store the blacklist information in a data structure (e.g., associated with messaging center device 230). Messaging center device 230 may receive a future message from spamming device 260 (e.g., a future email, a future SMS text message, etc.). Based on the blacklist information, messaging center device 230 may determine that the future message is associated with an identifier (e.g., a phone number, an email address, an IP address, etc.) associated with spamming device 260 (e.g., a sending device that has been blocked), and may determine that the message is intended for user device 210. Based on determining that spamming device 260 is a blocked device, messaging center device 230 may not deliver the future message to user device 210.

In some implementations, messaging center device 230 may block the future message based on a length of time associated with the sending device. For example, messaging center device 230 may receive a future message, and may determine whether a threshold period of time has passed before sending the future message to user device 210. In some implementations, if the threshold period of time includes a length of time that is greater than the duration of time associated with the blacklist information, messaging center device 230 may provide the future message to user device 210. Additionally, or alternatively, if the threshold period of time is less than the duration of time associated with the blacklist information, messaging center device 210 may block the message.

In some implementations, based on the response information, user device 210 may provide a report to reporting device 250 indicating that the message is spam. In some implementations, one or more technicians associated with reporting device 250 may use the report to address the spam (e.g., may determine to block future messages, may take legal action, etc.).

In some implementations, user device 210 may be associated with other user devices 210 (e.g., other user devices 210 associated with a user of user device 210). For example, messaging center device 230 may provide messages received by user device 210 to other user devices 210. In some implementations, based on determining that the message is spam, messaging center device 230 may provide an indication to the other user devices 210 that the message is to be deleted. Based on the indication, the other user devices 210 may delete the message.

In some implementations, user device 210 may provide blacklist information to other user devices 210 (e.g., associated with a user of user device 210). Based on the blacklist information, the other user devices 210 may block future messages from spamming device 260. In some implementations, user device 210 and/or messaging center device 230 may provide the blacklist information to other devices (e.g., user devices 210, network devices of network 220, etc.). For example, a user of user device 210 may provide user input indicating that the blacklist information is to be shared with another device. Based on the user input, user device 210 and/or messaging center device 230 may provide the blacklist information to the other device.

In some implementations, messaging center device 230 may receive blacklist information from a set of user devices 210 (e.g., first blacklist information from a first user device 210-1, second blacklist information from a second user device 210-2, etc.), and may aggregate the blacklist information. In some implementations, messaging center device 210 may analyze the aggregated blacklist information to determine global blacklist information for user devices 210 (e.g., all or a subset of user devices 210 associated with messaging center device 230).

In some implementations, messaging center device 230 may score each entry in the aggregated blacklist information. For example, messaging center device 230 may score each entry in the blacklist information based on a quantity of user devices 210 that provided the same blacklist entry. Additionally, or alternatively, messaging center device 230 may score each entry based on the score, or a combination of the scores, generated for the entry. In some implementations, messaging center device 230 may score each entry based on a length of time associated with blocking the message.

In some implementations, based on the score for a particular blacklist entry, messaging center device 230 may block future messages from a sending device associated with the particular blacklist entry, determine a length of time for blocking future messages from the sending device, or the like. Additionally, or alternatively, based on the score for the particular blacklist entry, messaging center device 230 may provide the particular blacklist entry to other devices (e.g., user devices 210, reporting device 250, network devices associated with network 220, etc.) and/or a human operator to permit appropriate action to be taken (e.g., to take legal action, to block future messages, etc.).

Although FIG. 4 shows example blocks of process 400, in some implementations, process 400 may include additional blocks, different blocks, and/or differently arranged blocks than those depicted in FIG. 4. Additionally, or alternatively, one or more of the blocks of process 400 may be performed in parallel. Further, one or more blocks may be omitted in some implementations.

Although process 400 has been described as being performed by user device 210, in some implementations, some or all of process 400 may be performed by messaging center device 230. For example, messaging center device 240 may receive triggering information (e.g., block 410), may receive a message from a sending device (e.g., block 420), may determine that the message is spam based on the triggering information (e.g., block 430), may provide a notification that the message is spam (e.g., block 440), may receive response information based on the notification (e.g., block 450), and/or may cause a future message from the sending device to be blocked based on the response information (e.g., block 460).

Figure 5A:
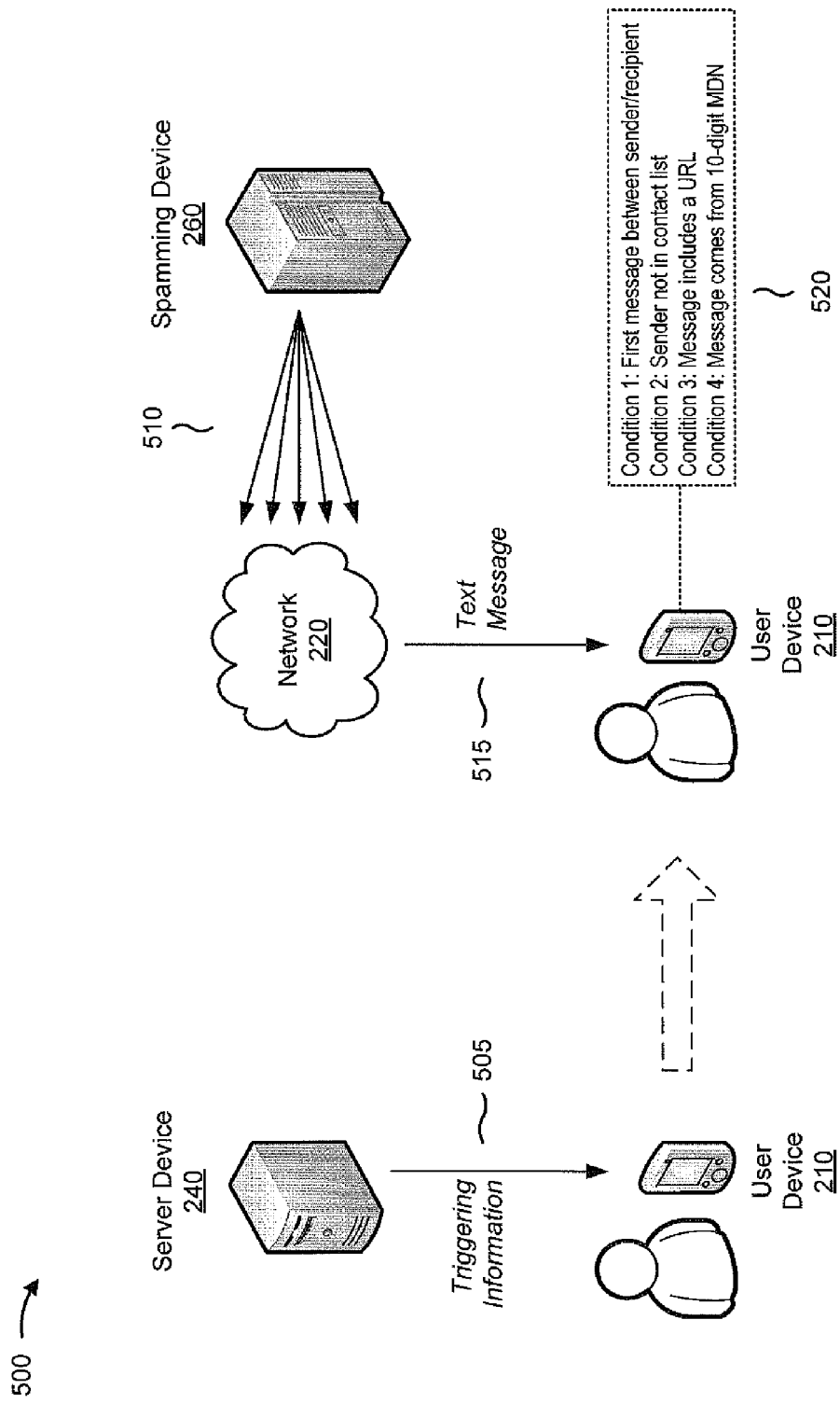
FIGS. 5A-5C are diagrams of an example implementation relating to the example process shown in FIG. 4.
Figure 5B:
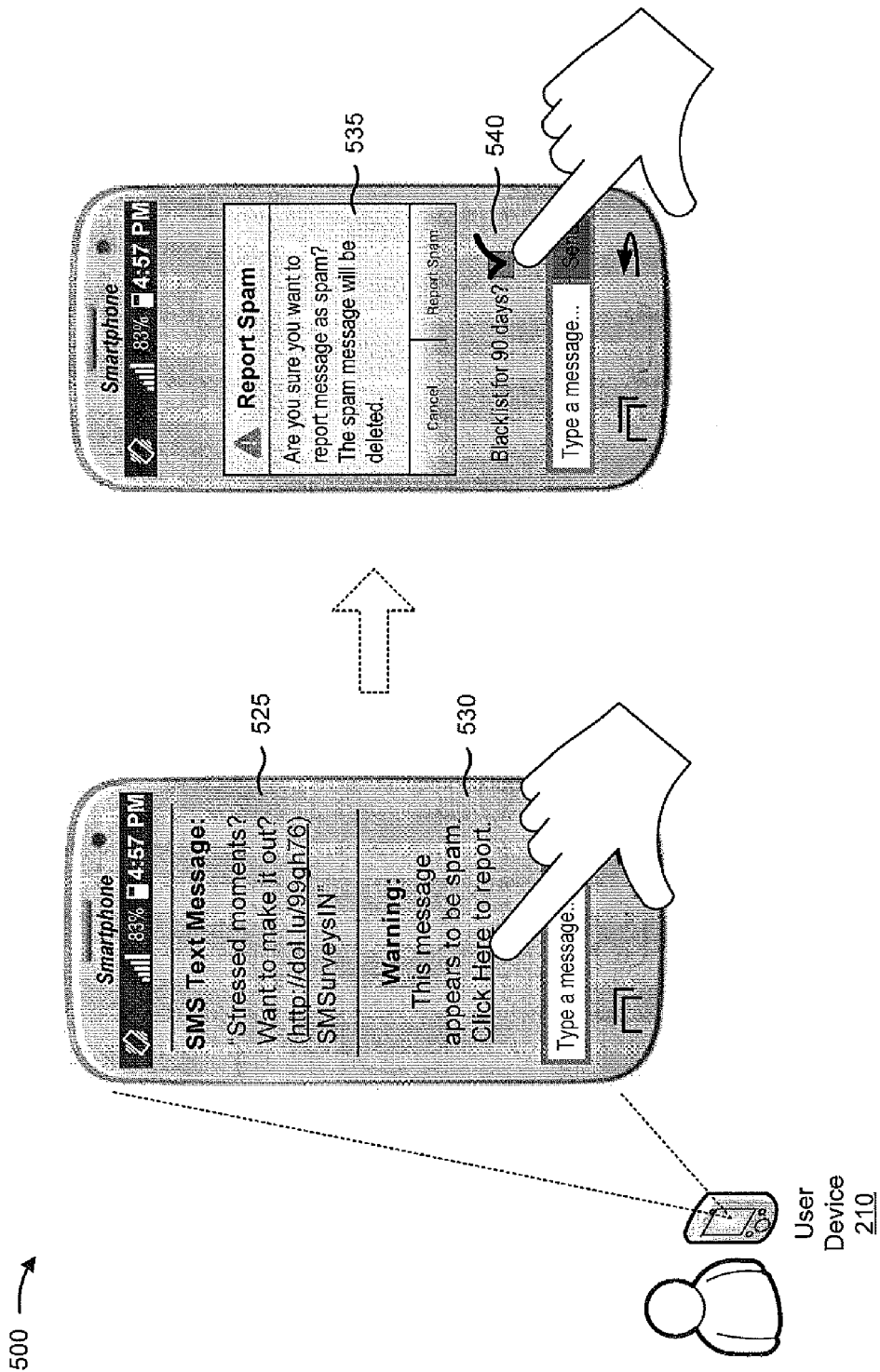
Figure 5C:
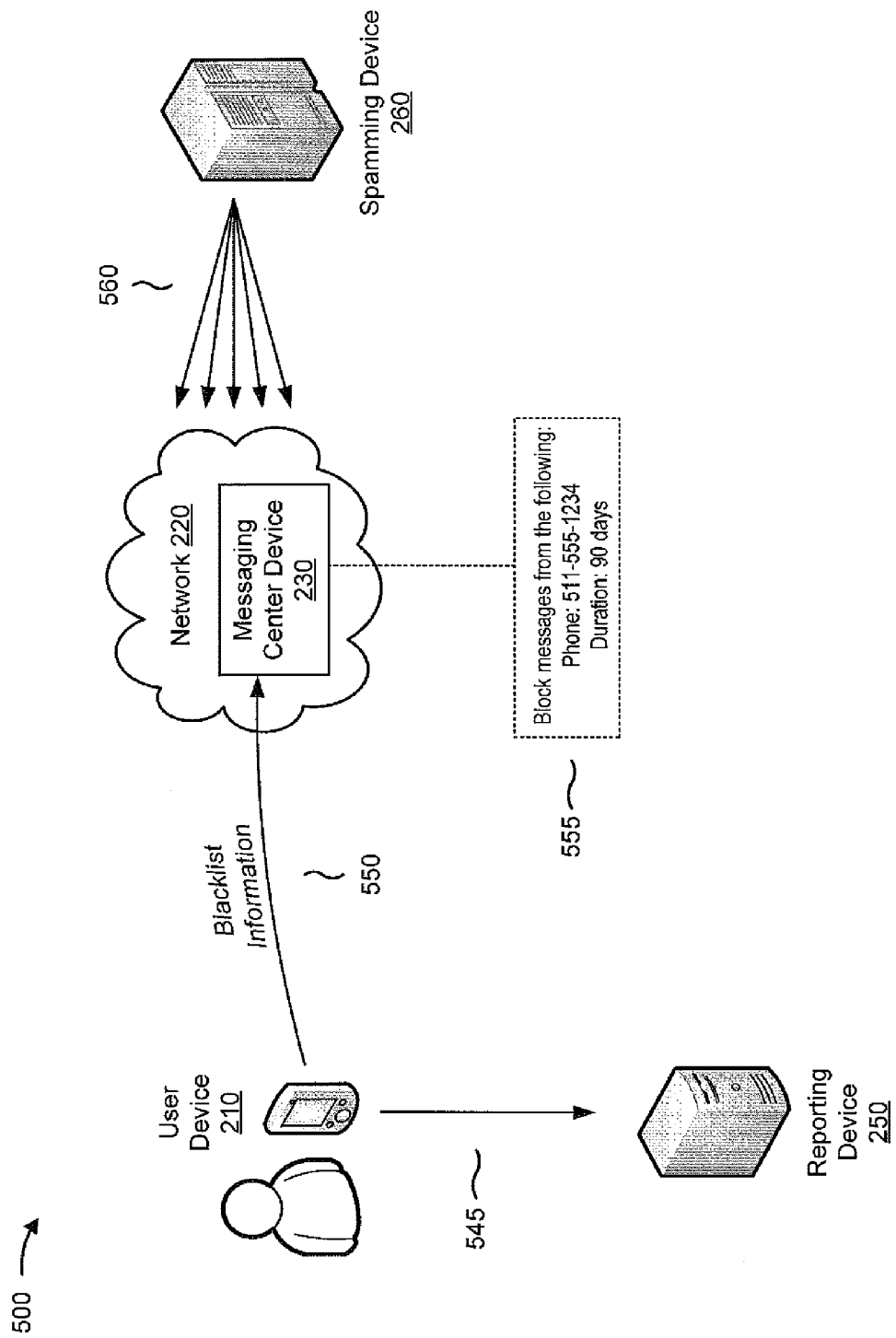

FIGS. 5A-5C are diagrams of an example implementation 500 relating to process 400 (FIG. 4). In example implementation 500, user device 210 (e.g., a smartphone) may determine that an SMS text message, sent by spamming device 260, is spam, and may provide blacklist information that permits messaging center device 230 to block future messages from spamming device 260.

As shown in FIG. 5A, and by reference number 505, user device 210 may receive triggering information from server device 240. The triggering information may include information that identifies a set of conditions. The set of conditions may include a first condition (e.g., that the message is a first message between user device 210 and a sending device), a second condition (e.g., that the sender is in a contact list associated with user device 210), a third condition (e.g., that the message includes a call to action), and a fourth condition (e.g., that the message is an email or is associated with a 10-digit phone number).

As shown by reference number 510, spamming device 260 may send a set of bulk SMS text messages to a set of user devices 210, including user device 210, via network 220. As shown by reference number 515, user device 210 may receive an SMS text message of the set of SMS text messages. The SMS text message may include an advertisement, and may include a URL to direct a reader of the SMS text message to a website associated with the advertisement.

As shown by reference number 520, user device 210 may determine that the SMS text message satisfies the set of conditions. User device 210 may determine that the SMS text message is a first message between user device 210 and spamming device 260 (e.g., that the SMS text message satisfies the first condition). User device 210 may determine that spamming device 260 is not identified in a contact list associated with user device 210 (e.g., that the SMS text message satisfies the second condition). User device 210 may determine that the message includes a URL (e.g., that the SMS text message satisfies the third condition). User device 210 may determine that the SMS text message is associated with a 10-digit MDN (e.g., that the SMS text message satisfies the fourth condition).

As shown in FIG. 5B, and by reference number 525, user device 210 may display the SMS text message on a touchscreen associated with user device 210. Based on determining that the SMS text message satisfies the set of conditions, user device 210 may display a notification below the SMS text message, as shown by reference number 530. The notification may include a warning (e.g., "this message appears to be spam"), as well as a URL to report the spam (e.g., "click here"). A user of user device 210 may provide response information by clicking on the URL (e.g., by indicating that the SMS text message is to be reported as spam).

As shown by reference number 535, user device 210 may display a confirmation announcement indicating that the SMS text message will be deleted. Additionally, user device 210 may display an option to blacklist the sending device (e.g., spamming device 260) for a time period of ninety days, as shown by reference number 540. The user may provide response information (e.g., user input), via the touchscreen, to report the SMS text message as spam and to blacklist the sending device.

As shown in FIG. 5C, and by reference number 545, based on the response information, user device 210 may send a report to reporting device 250 indicating that the SMS text message is spam. The report may include an identifier (e.g., the 10-digit MDN) that identifiers spamming device 260, and may permit reporting device 250 to address the spam by determining to block future messages, taking legal action, or the like.

As shown by reference number 550, user device 210 may provide blacklist information to messaging center device 230. As shown by reference number 555, the blacklist information may identify a phone number associated with SMS text message (e.g., "511-555-1234") and a duration of time (e.g., "90 days") for which messages from spamming device 260 are to be blocked. As shown by reference number 560, spamming device 260 may send additional SMS text messages intended for user device 210. Based on the blacklist information, messaging center device 230 may identify spamming device 260 as a blocked sending device, and may prevent the additional SMS text messages from being delivered to user device 210.

As indicated above, FIGS. 5A-5C are provided merely as an example. Other examples are possible and may differ from what was described with regard to FIGS. 5A-5C.

Figure 6A:
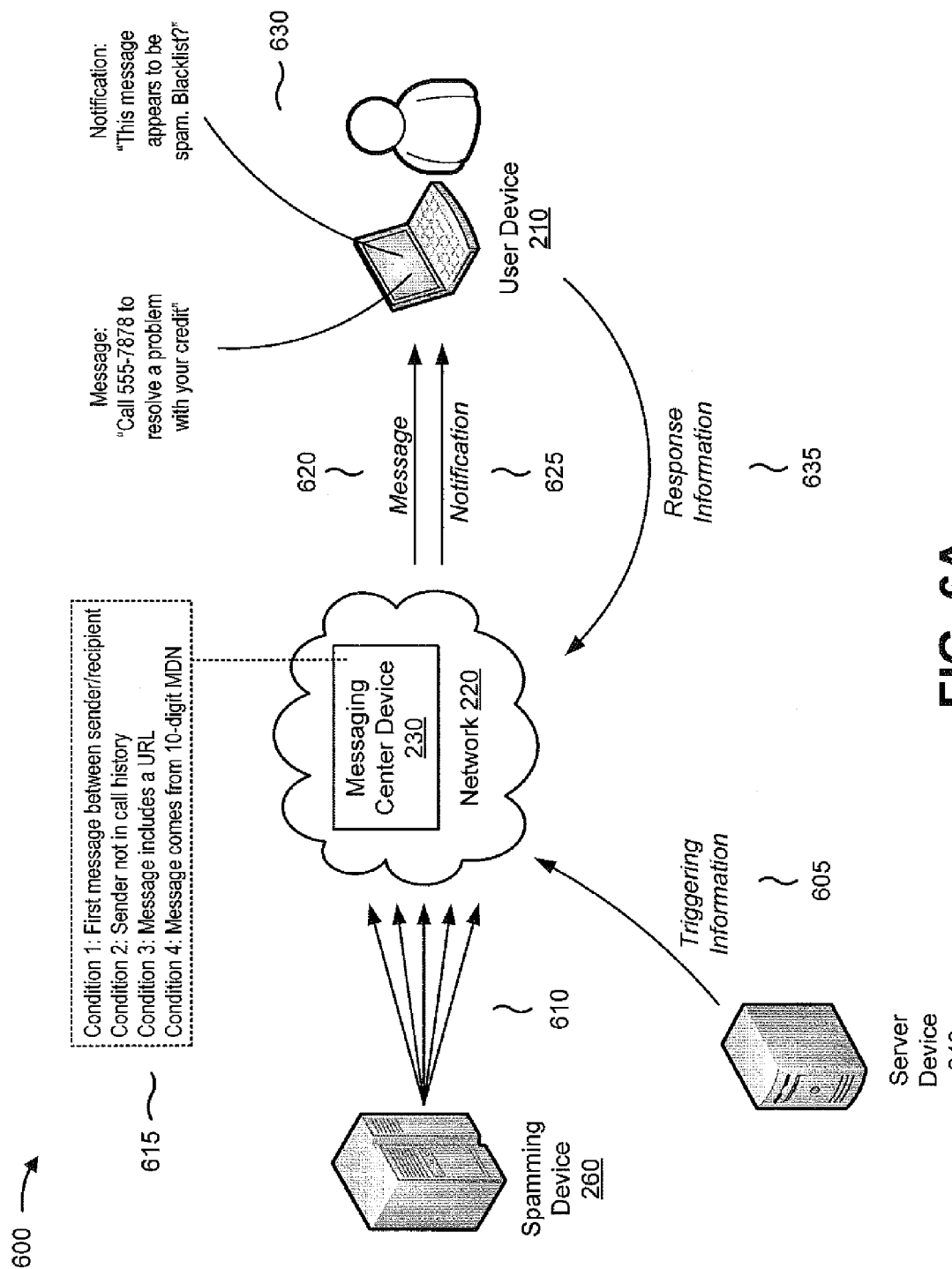

FIGS. 6A-6B are diagrams of another example implementation 600 relating to process 400 (FIG. 4). In example, implementation 600, messaging center device 230 may determine that an MMS message, from spamming device 260, is spam, and may provide a notification to user device 210. Based on response information, messaging center device 230 may determine blacklist information and may block future messages from spamming device 260.

As shown in FIG. 6A, and by reference number 605, messaging center device 230 may receive triggering information. The triggering information may include a set of conditions. The set of conditions may include a first conditions (e.g., that the message is a first message between user device 210 and a sending device), a second condition (e.g., that the sender is in a call history associated with user device 210), a third condition (e.g., that the message includes a call to action) and a fourth condition (e.g., that the message is associated with a 10-digit phone number).

As shown by reference number 610, spamming device 260 may send a set of bulk MMS messages to a set of user devices 210, including user device 210, via network 220 and messaging center device 230. Messaging center device 230 may receive an MMS message of the set of MMS messages. As shown by reference number 615, messaging center device 230 may determine that the MMS message satisfies the set of conditions. Messaging center device 230 may determine that the MMS message is a first message between user device 210 and spamming device 260 (e.g., that the MMS message satisfies the first condition). Messaging center device 230 may determine that spamming device 260 is not identified in a call history associated with user device 210 (e.g., that the MMS message satisfies the second condition). Messaging center device 230 may determine that the message includes an invitation to call a phone number (e.g., that the MMS message satisfies the third condition). Messaging center device 230 may determine that the MMS message has been sent by spamming device using a 10-digit MDN (e.g., that the MMS message satisfies the fourth condition).

As shown by reference number 620, messaging center device 230 may provide the MMS message to user device 210. Based on determining that the MMS message satisfies the set of conditions, messaging center device 230 may provide a notification to user device 210, as shown by reference number 625. As shown by reference number 630, user device 210 may display the message (e.g., "Call 555-7878 to resolve a problem with your credit") and the notification (e.g., "This message appears to be spam. Blacklists"). As shown by reference number 635, a user of user device 210 may provide response information (e.g., via user input) confirming that the message is spam and is to be blacklisted. User device 210 may provide the response information to messaging center device 230.

As shown in FIG. 6B, and by reference number 640, messaging center device 230 may determine blacklist information based on the response information. The blacklist information may identify a phone number (e.g., "313-444-6262") associated with the MMS message (e.g., identifying spamming device 260 as a source of the MMS message). Additionally, the blacklist information may include a duration of time for blocking the sending device (e.g., "Forever"). As shown by reference number 645, messaging center device 230 may provide the blacklist information to reporting device 250.

As shown by reference number 650, spamming device 260 may send additional MMS messages intended for user device 210. Based on the blacklist information, messaging center device 230 may prevent the additional MMS messages from being delivered to user device 210.

As indicated above, FIGS. 6A-6B are provided merely as an example. Other examples are possible and may differ from what was described with regard to FIGS. 6A-6B.

Figure 7:
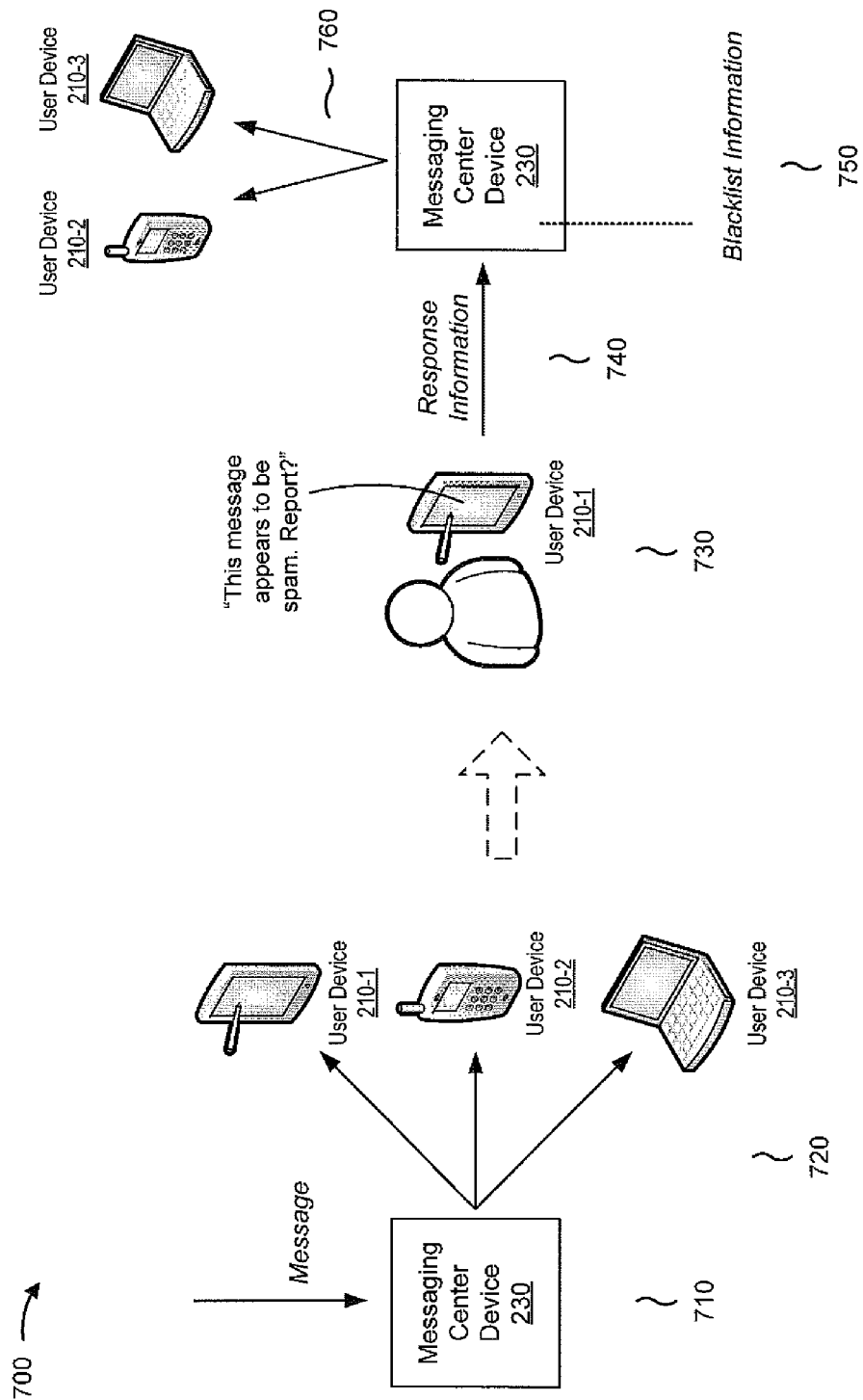
FIG. 7 is a diagram of yet another example implementation relating to the example process shown in FIG. 4.

FIG. 7 is a diagram of yet another example implementation 700 relating to process 400 (FIG. 4). In example implementation 700, a set of user devices 210 may be associated with a user. A first user device 210-1, of the set of user devices 210, may determine that a message received from a sending device is spam, and may receive response information indicating that the sending device is to be blacklisted. Based on the response information, messaging center device 230 may cause the message from a remaining set of user devices 210 to be deleted.

As shown by reference number 710, messaging center device 230 may receive a message (e.g., an SMS text message) intended for first user device 210-1. As shown by reference number 720, messaging center device 230 may provide the SMS text message to the set of user devices 210 associated with a user (e.g., first user device 210-1, second user device 210-2, and third user device 210-3), which may permit the user to access the message using any of the set of user devices 210.

As shown by reference number 730, the user may access the message using first user device 210-1. Based on triggering information, first user device 210-1 may determine that the message is spam (e.g., may determine that the message satisfies a threshold quantity of conditions), and may display a notification (e.g., "This message appears to be spam. Report?"). First user device 210-1 may receive response information (e.g., via user input) indicating that the message is to be reported as spam and blacklisted for a period of time. As shown by reference number 740, first user device 210-1 may provide the response information to messaging center device 230.

As shown by reference number 750, messaging center device 230 may determine blacklist information, based on the response information, associated with the message (e.g., information that allows messaging center device 230 to block future messages from the sending device). As shown by reference number 760, messaging center device 230 may provide an indication to second user device 210-2 and third user device 210-3 that the message is spam and is to be deleted. Second user device 210-2 and third user device 210-3 may delete the message based on the indication.

As indicated above, FIG. 6 is provided merely as an example. Other examples are possible and may differ from what was described with regard to FIG. 6.

Implementations described herein may allow a user device to automatically determine that a message from a sending device is spam, and may prevent future messages, provided by the sending device, from being delivered to the user device.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein. In some implementations, the user interfaces may be customizable by a device or a user. Additionally, or alternatively, the user interfaces may be pre-configured to a standard configuration, a specific configuration based on capabilities and/or specifications associated with a device on which the user interfaces are displayed, or a set of configurations based on capabilities and/or specifications associated with a device on which the user interfaces are displayed.

Some implementations are described herein in conjunction with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
   one or more processors coupled to one or more memories,
      the one or more memories storing instructions for use by the one or more processors to:
      receive triggering information,
         the triggering information including a plurality of conditions,
         the plurality of conditions being associated with spam;
      receive a message from a sending device;
      determine that the message is spam based on the message satisfying a threshold quantity of conditions of the plurality of conditions;
      provide a notification indicating that the message is spam to a user of the device based on the device having determined that the message is spam;
      receive response information from the user of the device based on the notification,
         the response information indicating that the sending device is to be blacklisted;
      determine a particular length of time that the sending device is to be blacklisted based on lengths of time to blacklist the sending device selected by other users of other devices; and
      cause, based on the response information, a future message from the sending device to be blocked prior to being presented to the user based on the particular length of time that the sending device is to be blacklisted,
         the message and the future message being at least one of an email, a short message service (SMS) text message, a multimedia message service (MMS) message, or an instant message.

2. The device of claim 1, where the plurality of conditions includes an indication that the message is a first message from the sending device directed to the user; and
   where the one or more processors, when determining that the message is spam, are to:
      determine that the message is the first message from the sending device; and determine that the message is spam based on determining that the message is the first message from the sending device.

3. The device of claim 1, where the plurality of conditions includes an indication that the sending device is not associated with a contact list associated with the user; and
where the one or more processors, when determining that the message is spam, are to:
determine that the sending device is not associated with the contact list; and
determine that the message is spam based on determining that the sending device is not associated with the contact list.

4. The device of claim 1, where the plurality of conditions includes an indication that the message includes a call to action; and
where the one or more processors, when determining that the message is spam, are to:
determine that the message includes the call to action; and
determine that the message is spam based on determining that the message includes the call to action.

5. The device of claim 1, where the plurality of conditions includes an indication that the message is associated with a telephone number of a particular length;
where the one or more processors, when determining that the message is spam, are to:
determine that the message is associated with a telephone number of the particular length; and
determine that the message is spam based on determining that the message is associated with a telephone number of the particular length.

6. The device of claim 1, where the one or more processors, when determining that the message is spam, are to:
identify a plurality of approved sending devices; and
determine that the message is not associated with an approved sending device of the plurality of approved sending devices.

7. The device of claim 1, where the one or more processors are further to:
determine a plurality of weights associated with the plurality of conditions,
the plurality of weights including a first weight and a second weight,
the first weight being different from the second weight;
determine a score associated with the message based on the plurality of conditions, the first weight, and the second weight; and
where the one or more processors, when determining that the message is spam, are to:
determine that the message is spam based on the score satisfying a threshold score.

8. The device of claim 1, where the one or more processors, when determining the particular length of time, are to:
determine the particular length of time based on an average of the lengths of time to blacklist the sending device selected by the other users of the other devices.

9. A non-transitory computer-readable medium storing instructions, the instructions comprising:
one or more instructions that, when executed by one or more processors of a user device, cause the one or more processors to:
receive a plurality of conditions,
the plurality of conditions being associated with spam;
receive a message from a sending device;
determine that the message is spam based on the message satisfying a threshold quantity of conditions of the plurality of conditions;
provide a notification indicating that the message is spam to a user of the user device based on the user device having determined that the message is spam;
receive response information from the user of the user device based on the notification,
the response information indicating that the sending device is to be blacklisted;
determine a particular length of time that the sending device is to be blacklisted based on lengths of time to blacklist the sending device selected by other users of other devices; and
cause, based on the response information, a future message from the sending device to be blocked prior to being presented to the user based on the particular length of time that the sending device is to be blacklisted,
the message and the future message being at least one of an email, a short message service (SMS) text message, a multimedia message service (MMS) message, or an instant message.

10. The non-transitory computer-readable medium of claim 9, where the message includes a uniform resource locator,
the uniform resource locator being associated with a web site; and
where the one or more instructions, when executed by the one or more processors, further cause the one or more processors to:
prevent a preview of the web site from being displayed based on determining that the message is spam.

11. The non-transitory computer-readable medium of claim 9, where the one or more instructions, that cause the one or more processors to provide the notification, cause the one or more processors to:
present the notification for display on a user interface associated with the user device; and
where the one or more instructions, that cause the one or more processors to receive the response information, cause the one or more instructions to:
receive the response information via the user interface.

12. The non-transitory computer-readable medium of claim 9, where the one or more instructions, that cause the one or more processors to cause the future message from the sending device to be blocked, cause the one or more processors to:
provide information, identifying the sending device, to a messaging center device to cause the messaging center device to block the future message from the sending device.

13. The non-transitory computer-readable medium of claim 9, where the one or more instructions, that cause the one or more processors to cause the future message from the sending device to be blocked, cause the one or more processors to:
cause the future message to be blocked without sending the future message to the user device associated with the user.

14. The non-transitory computer-readable medium of claim 9, where the notification includes a plurality of options,
the plurality of options including at least one of:
an option to report the message as spam;
an option to blacklist the sending device;

an option to blacklist the sending device for a period of time;
an option to ignore the notification; or
an option to designate the sending device as an approved sending device; and where the response information includes a selection of one of the plurality of options.

15. The non-transitory computer-readable medium of claim 9, where the one or more instructions, that cause the one or more processors to receive the response information, cause the one or more processors to:
receive a confirmation that the message is spam; and
where the one or more instructions, that cause the one or more processors to cause the future message to be blocked, cause the one or more processors to:
cause the future message to be blocked based on the confirmation.

16. A method, comprising:
receiving, by a device, triggering information,
the triggering information including a plurality of conditions,
the plurality of conditions being associated with spam;
receiving, by the device, a message from a sending device,
determining, by the device, that the message is spam based on the message satisfying a threshold quantity of conditions of the plurality of conditions;
providing, by the device, a notification indicating that the message is spam to a user of the device based on the device having determined that the message is spam;
receiving, by the device, response information from the user of the device based on the notification,
the response information indicating that the sending device is to be blacklisted;
determining, by the device, a particular length of time that the sending device is to be blacklisted based on lengths of time to blacklist the sending device selected by other users of other devices; and
causing, by the device and based on determining the particular length of time that the sending device is to be blacklisted, a future message from the sending device to be blocked prior to being presented to the user,
the message and the future message being at least one of an email, a short message service (SMS) text message, a multimedia message service (MMS) message, or an instant message.

17. The method of claim 16, where causing the future message from the sending device to be blocked comprises:
determining whether the particular length of time has expired; and
blocking the future message when the particular length of time has not expired.

18. The method of claim 16, where the plurality of conditions includes an indication that the message is not associated with a short code; and
where determining that the message is spam comprises:
determining that the message is not associated with the short code; and
determining that the message is spam based on determining that the message is not associated with the short code.

19. The method of claim 16, further comprising:
determining, by the device, a plurality of user devices associated with the message; and
causing, by the device, the plurality of user devices to delete the message.

20. The method of claim 16, where determining that the message is spam comprises:
determining, by the device, that the message is spam based on more than one of the plurality of conditions being satisfied.

* * * * *